(12) United States Patent
Theuss et al.

(10) Patent No.: US 11,105,776 B2
(45) Date of Patent: Aug. 31, 2021

(54) DETECTOR MODULE FOR A PHOTO-ACOUSTIC GAS SENSOR

(71) Applicant: Infineon Technologies AG, Neubiberg (DE)

(72) Inventors: Horst Theuss, Wenzenbach (DE); Rainer Markus Schaller, Saal a.d. Donau (DE)

(73) Assignee: Infineon Technologies AG, Neubiberg (DE)

( * ) Notice: Subject to any disclaimer, the term of this patent is extended or adjusted under 35 U.S.C. 154(b) by 174 days.

(21) Appl. No.: 16/534,143

(22) Filed: Aug. 7, 2019

(65) Prior Publication Data

US 2020/0057031 A1 Feb. 20, 2020

(30) Foreign Application Priority Data

Aug. 17, 2018 (DE) ..................... 10 2018 120 061.7

(51) Int. Cl.
*G01N 29/24* (2006.01)
*G01N 21/17* (2006.01)

(52) U.S. Cl.
CPC ..... *G01N 29/2425* (2013.01); *G01N 21/1702* (2013.01); *G01N 2291/021* (2013.01)

(58) Field of Classification Search
CPC ........... G01N 29/2425; G01N 21/1702; G01N 2291/021; G01N 29/222; G01N 29/022; G01N 2021/1708; G01N 2021/1704
See application file for complete search history.

(56) References Cited

U.S. PATENT DOCUMENTS

| | | | |
|---|---|---|---|
| 6,344,647 B1 * | 2/2002 | Jourdain | G01N 21/1702 250/339.07 |
| 9,513,261 B2 | 12/2016 | Dehe et al. | |
| 10,347,814 B2 | 7/2019 | Glacer | |
| 2016/0282259 A1 | 9/2016 | Kolb et al. | |
| 2016/0313288 A1 * | 10/2016 | Theuss | G01N 29/032 |

(Continued)

FOREIGN PATENT DOCUMENTS

| | | |
|---|---|---|
| DE | 10 2004 030 380 | 1/2006 |
| DE | 10 2014 114 672 | 4/2015 |
| DE | 10 2016 205 024 | 9/2016 |

(Continued)

*Primary Examiner* — David P Porta
*Assistant Examiner* — Meenakshi S Sahu
(74) *Attorney, Agent, or Firm* — Dicke, Billig & Czaja, PLLC

(57) ABSTRACT

A detector module is disclosed. In one example, the detector module is for a photo-acoustic gas sensor and comprises a first substrate made of a semiconductor material and comprising a first surface and a second surface opposite to the first surface, a second substrate comprising a third surface, a fourth surface opposite to the third surface, and a first recess formed in the fourth surface. The second substrate is connected with its fourth surface to the first substrate so that the first recess forms an airtight-closed first cell which is filled with a reference gas and a pressure sensitive element comprising a membrane disposed in contact with the reference gas. The detector module is further configured such that a beam of light pulses passes through the first substrate and thereby enters the first cell.

20 Claims, 5 Drawing Sheets

(56) References Cited

U.S. PATENT DOCUMENTS

2017/0212036 A1\* 7/2017 Mueller ............... A61B 5/0095
2017/0350868 A1 12/2017 Tumpold et al.

FOREIGN PATENT DOCUMENTS

| DE | 10 2017 102 188 | 10/2017 |
|----|-----------------|---------|
| DE | 10 2017 112 197 | 12/2017 |
| WO | 96/24831 | 8/1996 |
| WO | 2016/105920 | 6/2016 |

\* cited by examiner

DETECTOR MODULE FOR A PHOTO-ACOUSTIC GAS SENSOR

CROSS-REFERENCE TO RELATED APPLICATION

This Utility patent application claims priority to German Patent Application No. 10 2018 120 061.7, filed Aug. 17, 2018, which is incorporated herein by reference.

TECHNICAL FIELD

The present disclosure relates to an electronic module for a photo-acoustic gas sensor, to a photo-acoustic gas sensor, and to a method for fabricating a detector module for a photo-acoustic gas sensor.

BACKGROUND

In the past, many types of gas sensor devices have been developed in order to detect that the atmosphere or the natural environment contains potentially harmful or hazardous components and, if possible, to provide a warning thereof to a person. The proper function of gas sensors can be of great importance in many applications, especially when these sensors are used for insuring the safety of working personal. Besides that, the space consumption of gas sensors also becomes more and more important as the size of many apparatuses and instruments is continuously getting smaller. This overall trend of miniaturization creates a need to develop more compact gas sensors which can be easily incorporated into existing apparatuses or instruments.

A photo-acoustic gas sensor, as described in the present disclosure, is based on the following effect. An infrared (IR) pulse, which is chopped with audio-frequency, is absorbed by a gas and is provoking a local pressure increase which can be sensed by a pressure sensitive element (for instance a microphone). The absorption is specific for a certain gas, e.g. characteristic rotational or vibrational modes of atoms or molecules of the gas. This can be used to build-up a selective photo-acoustic gas sensor. The photo-acoustic gas sensor of the present disclosure therefore usually comprises an emitter module and a detector module. The above-mentioned trend of miniaturization naturally relates to both types of modules of a photo-acoustic gas sensor whereas the present disclosure is directed mainly to a detector module.

SUMMARY

A first aspect of the present disclosure relates to a detector module. The detector module according to the first aspect comprises a first substrate made of a semiconductor material and comprising a first surface and a second surface opposite to the first surface, a second substrate comprising a third surface, a fourth surface opposite to the third surface, and a first recess formed in the fourth surface, wherein the second substrate is connected with its fourth surface to the first substrate so that the first recess forms an airtight-closed first cell which is filled with a reference gas, and a pressure sensitive element comprising a membrane disposed in contact with the reference gas, wherein the detector module is further configured such that a beam of light pulses passes through the first substrate and thereby enters the first cell.

It should be mentioned that throughout the present disclosure the term "light" in general refers to electromagnetic radiation of any wavelength which can be applied in a photo-acoustic gas sensor in connection with an appropriate reference gas. In many cases the electromagnetic radiation will be in the infrared range, but electromagnetic radiation of other wavelengths is also possible.

According to an embodiment of the detector module of the first aspect, the first substrate is made of silicon.

According to an embodiment of the detector module of the first aspect, the second substrate is made of one or more of a semiconductor material, silicon, glass, or sapphire.

According to an embodiment of the detector module of the first aspect, the second substrate is connected to the first substrate by one of anodic bonding, soldering or glass frit bonding.

According to an embodiment of the detector module of the first aspect, at least a part of the first substrate is transparent at the wavelength of the light pulses. According to a further embodiment thereof, also at least a part of the second substrate is transparent at the wavelength of the light pulses. Transparency may mean, for example, that at least 60%, 65%, 70%, 75%, 80%, 85%, 90%, or 95% of the light is transmitted through the first or second substrate. As regards the first substrate, the first substrate may comprise a recess so that it is transparent at the wavelength of the light pulses in the area of the recess. As regards the second substrate, it might be transparent in an area in which the beam of light pulses is impinging onto the second substrate after having passed through the first cell. In this way any thermal impact and detrimental effects resulting therefrom can be minimized.

According to an embodiment of the detector module of the first aspect, the pressure sensitive element further comprises a transducer connected with the membrane and configured to convert oscillations of the membrane into an electrical signal, the transducer being disposed on the first surface of the first substrate. In some embodiments the transducer can have the form of a thin layer which is connected with the membrane within the first cell and extends underneath the second substrate to the outside of the first cell whilst still residing on the first surface of the first substrate. The transducer may, for example, comprise a piezo-electric layer.

According to an embodiment of the detector module of the first aspect, the pressure sensitive element is comprised of a semiconductor MEMS pressure sensitive element disposed in the first cell. The MEMS microphone or MEMS pressure sensor may, for example, be disposed on the first surface of the first substrate.

According to an embodiment of the detector module of the first aspect, the first substrate comprises a first recess, the first recess being configured to one or more of: comprise a light inlet opening of the module, and comprise a bottom portion which forms a part of the membrane. More specifically, one embodiment of a detector module would be such that the first recess would comprise a light inlet opening of the detector module, but not a part of the membrane. Another embodiment of the detector module would be such that the first recess would comprise a bottom portion which forms a part of the membrane, but not a light inlet opening of the module. Another embodiment of the detector module would be such that the first recess both comprises a light inlet opening of the detector module, and a bottom portion which forms a part of the membrane. These and other embodiments of the detector module will be shown and explained in more detail further below. It should be noted at this point that it is not a necessary feature that the first substrate comprises a recess in its second surface. If, for example, the pressure sensitive element is comprised of a pressure sensitive element chip disposed in the cell, and the first substrate comprises a very high transparency there is no need for a recess at the light input opening. Depending on the transparency, the first substrate can even have a certain minimum thickness for stability reasons.

According to an embodiment of the detector module of the first aspect the membrane forms a portion of the first substrate. In particular, it can be the case that the first substrate comprises a first recess formed in the second surface thereof, wherein the membrane is in part formed by the bottom of the first recess. According to a further embodiment thereof, the first recess comprises a light inlet opening of the detector module. According to another example, the first substrate comprises a second recess, wherein the second recess comprises a light inlet opening of the module.

According to an embodiment of the detector module of the first aspect, the first substrate comprises a recess, the membrane is part of a semiconductor chip disposed in the cell, and the recess comprises a light inlet opening of the detector module.

According to an embodiment of the detector module of the first aspect, the first substrate comprises a first recess and a second recess both formed in the second surface and both being configured as light input openings, and the second substrate comprises a first recess and a second recess formed in the second surface, wherein the first recess forms a first cell which is filled with the reference gas, and the second recess forms a second cell which is not filled with the reference gas, and a first semiconductor chip comprising a first membrane is disposed in the first cell and a second semiconductor chip comprising a second membrane is disposed in the second cell, wherein the second semiconductor chip is configured to provide a background signal to enable a differential measurement. According to an example thereof, the first and second semiconductor chips can be configured as semiconductor MEMS pressure sensitive element chips, which will be shown and explained in more detail further below.

A second aspect of the present disclosure relates to a photo-acoustic gas sensor. The photo-acoustic gas sensor of the second aspect comprises at least one light emitter module and a detector module according to the first aspect.

The light emitter module can be configured such that it comprises a light emitter configured to emit a beam of light pulses with a predetermined repetition frequency and a wavelength corresponding to an absorption band of a gas to be sensed.

According to an embodiment of the photo-acoustic gas sensor of the second aspect, the photo-acoustic gas sensor is configured such that the light emitter module and the detector module are both connected to a common carrier or platform so that they have a constant spatial relationship to each other. The photo-acoustic gas sensor maybe further configured such that an intermediate space between the detector module and the emitter module has openings to the outside so that a gas to be sensed can flow freely through the intermediate space.

A third aspect of the present disclosure relates to a method for fabricating a detector module for a photo-acoustic gas sensor. The method comprises providing a first substrate made of a semiconductor material and comprising a first surface and a second surface opposite to the first surface, providing a pressure sensitive element on or above the first substrate, providing a second substrate comprising a third surface and a fourth surface opposite to the first surface, and a recess formed in the fourth surface, and connecting the second substrate with its fourth surface to the first surface of the first substrate and enclosing a reference gas in a thereby formed airtight-closed cell.

According to an embodiment of the method of the third aspect, connecting the second substrate to the first substrate comprises one of anodic bonding, soldering or glass frit bonding.

According to an embodiment of the method of the third aspect, enclosing the reference gas in the airtight-closed cell can be done by connecting the first and second substrates in a reference gas atmosphere. Alternatively, the reference gas can be filled into the airtight-closed cell via a through-opening formed in one of the first and second substrates. For example, the second substrate can be provided with such a through-hole formed in the cover portion of the second substrate. After filling the reference gas into the airtight-closed cell the through-hole can be sealed.

According to an embodiment of the method of the third aspect, providing a pressure sensitive element comprises forming a recess into the second surface of the first substrate to such a depth that an membrane is formed at the bottom of the recess, and disposing a transducer, in particular a piezoelectric layer, onto the first surface of the first substrate so that it is connected with the membrane.

According to an embodiment of the method of the third aspect, providing a pressure sensitive element comprises providing a semiconductor MEMS pressure sensitive element chip and disposing the semiconductor MEMS pressure sensitive element chip in the cell, in particular by placing it on the first surface of the first substrate.

According to an embodiment of the method of the third aspect, the method further comprises fabricating a plurality of detector modules by performing a wafer level process.

According to an example thereof, the method comprises providing a first substrate made of a semiconductor material and comprising a first upper surface and a second lower surface opposite to the first surface, providing a plurality of pressure sensitive elements on or above the first substrate, providing a second substrate comprising a third surface and a fourth surface and a plurality of first recesses formed in the fourth surface, fabricating a module panel by connecting the second substrate with its fourth surface to the first substrate and enclosing a reference gas in a thereby formed plurality of airtight-closed first cells, and singulating the module panel into a plurality of separate detector modules.

Further embodiments of the method of the third aspect can be formed in accordance with embodiments of a detector module of the first aspect or by adding one or more features as described in embodiments of a detector module described further below.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

DETAILED DESCRIPTION OF THE DRAWINGS

In the following detailed description, reference is made to the accompanying drawings, in which are shown by way of illustration specific aspects in which the disclosure may be practiced. In this regard, directional terminology, such as "top", "bottom", "front", "back", etc. may be used with reference to the orientation of the figures being described. Since components of described devices may be positioned in a number of different orientations, the directional terminology may be used for purposes of illustration and is in no way limiting. Other aspects may be utilized and structural or logical changes may be made without departing from the concept of the present disclosure. Hence, the following detailed description is not to be taken in a limiting sense, and the concept of the present disclosure is defined by the appended claims.

Figure 1:
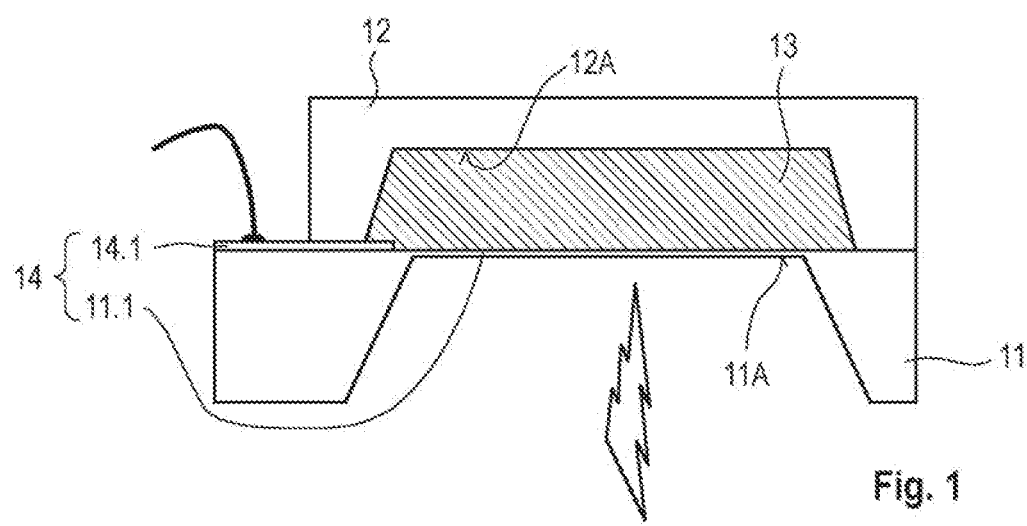
FIG. 1 shows an example of a detector module according to the first aspect in a cross-sectional view, wherein in this example a recess formed in the first substrate serves as a light inlet opening and at the same time provides an membrane at the bottom of the recess.

FIG. 1 shows an example of a detector module for a photo-acoustic gas sensor according to the first aspect. The detector module 10 of FIG. 1 comprises a first substrate 11 made of a semiconductor material and comprising a first upper surface and a second lower surface opposite to the first surface, a second substrate 12 comprising a third surface, a fourth surface opposite to the third surface, and a recess 12A formed in the fourth surface, wherein the second substrate 12 is connected with its fourth surface to the first substrate 11 so that the recess 12A forms an airtight-closed cell 13, which is filled with a reference gas. The first substrate 11 further comprises a recess 11A having a depth so that a bottom portion of the substrate 11 in the area of the recess 11A forms a membrane 11.1. The membrane 11.1 is thus in direct contact with the reference gas in the cell 13. The detector module 10 is further configured such that a beam of light pulses may pass through the first substrate 11 and thereby enters the cell 13. The recess 11A thus also serves as a light inlet opening of the detector module 10 in this embodiment. In a view from below the recess 11A can have any desired form, whereas it can have in particular a circular form or a rectangular form, in particular a quadratic form.

The detector module 10 further comprises a pressure sensitive element 14, wherein the pressure sensitive element 14 comprises the membrane 11.1 and a transducer 14.1 being in mechanical contact with the membrane 11.1. The transducer 14.1 may be comprised of a piezoelectric layer formed on the first upper surface of the first substrate 11 and extending into the cell 13 where it is in mechanical contact with the membrane 11.1. The piezoelectric layer 14.1 extends through the intermediate space between the first substrate 11 and the second substrate 12 to the outside of the cell 13 whilst being disposed on the first upper surface of the first substrate 11. In an outside portion of the piezoelectric layer 14.1 an electric wire can be connected to it in order to tap the electrical signals generated by the piezoelectric layer 14.1.

The first substrate 11 can be made of silicon and the recess 11A can be generated, for example, by an anisotropic wet etch on a silicon wafer thereby creating a recess 11A with a trapezoidal cross-section so that the bottom portion is disposed along a {100} plane and the sidewalls are disposed along {111} planes in the silicon material. The etching can be done in such a way that the oscillatory membrane 11.1 comprises a thickness in a range from 1 μm to 20 μm.

The gas to be sensed and thus the reference gas within the cell 13 can be one of $CO_2$, $NO_x$, $H_2O$, $O_2$, $N_2$, $CH_4$, or alcohol.

The repetition frequency of the light pulses may be within an audio frequency range or within a frequency range from 1 Hz to 10 kHz, in particular from 1 Hz to 1 kHz, wherein a typical frequency range is from 1 Hz to 100 Hz corresponding to a pulse duration range from 0.01 s to 1 s.

The material of the first substrate 11 can be transparent at the wavelength of the light pulses, hence transparent in the infrared in case of a wavelength of the light pulses lying in the infrared region. As to the degree of transparency, a minimum condition can be set such that enough light should enter the cell 13 so that a signal can be measured by the microphone 14. In practice a transparency of greater than 50%, 60%, 70%, 80%, 90%, 95%, or higher may be provided.

The second substrate 12 can be made by one or more of a semiconductor material, silicon, glass, in particular borosilicate glass, or sapphire.

The second substrate 12 can as well be transparent at the wavelength of the light pulses, hence transparent in the infrared in case of infrared light pulses. The reason for this is that absorption of infrared light having passed through the reference gas in the upper wall of the second substrate 12 may lead to unwanted and detrimental thermal effects, which might distort the measurements. Hence, the transparency should be high enough so that no such detrimental effects will occur. In practice the transparency may be greater than 50%, 60%, 70%, 80%, 90%, 95%, or higher. It is also possible to dispose stacks of λ/4 dielectric layers of alternating refractive indices on the surfaces of the second substrates 12 in order to enhance the light transmission.

The second substrate 12 can be connected to the first substrate 11 by one of anodic bonding, soldering or glass frit bonding.

Figure 2:
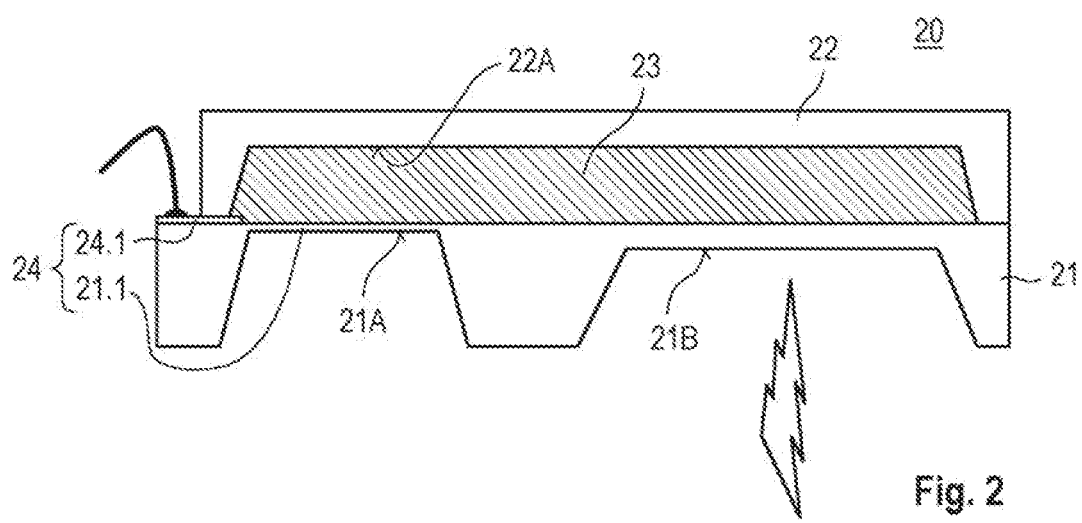
FIG. 2 shows an example of a detector module according to the first aspect in a cross-sectional view, wherein in this example the first substrate comprises first and second recesses, and the first recess provides an membrane at the bottom of the recess, and the second recess serves as a light inlet opening.

FIG. 2 shows another example of a detector module. The detector module 20 of FIG. 2 comprises a first substrate 21 and a second substrate 22 which is connected to the first substrate 21 in the same way as described in connection with the detector module 10 of FIG. 1. The first substrate 21 comprises a first recess 21A and a second recess 21B, wherein the first recess 21A can be formed in the same way as the first recess 11A of the detector module 10 of FIG. 1, and the second recess 21B serves as a light input opening of the detector module 20. Hence, the first recess 21A is formed such that an membrane 21.1 is formed at the bottom of the recess 21A and the second recess 21B is formed such that a thin layer is formed at the bottom of the recess 21B, wherein a thickness of the thin layer is such that it comprises a desired transparency for the incident light. As an example, the thickness may be in a range of 20 µm to 50 µm. The second substrate 22 comprises a recess 22A and is connected to the first substrate 21 so that an airtight-closed cell 23 is formed which is filled with a reference gas. The membrane 21.1 is connected with a transducer 24.1 in the same way as described with the detector module 10 of FIG. 1. The membrane 21.1 and the transducer 24.1 are thus part of a pressure sensitive element 24. The first and second substrates 21 and 22 can have the same properties as the first and second substrates 11 and 12 of the detector module 10 of FIG. 1.

Figure 3:
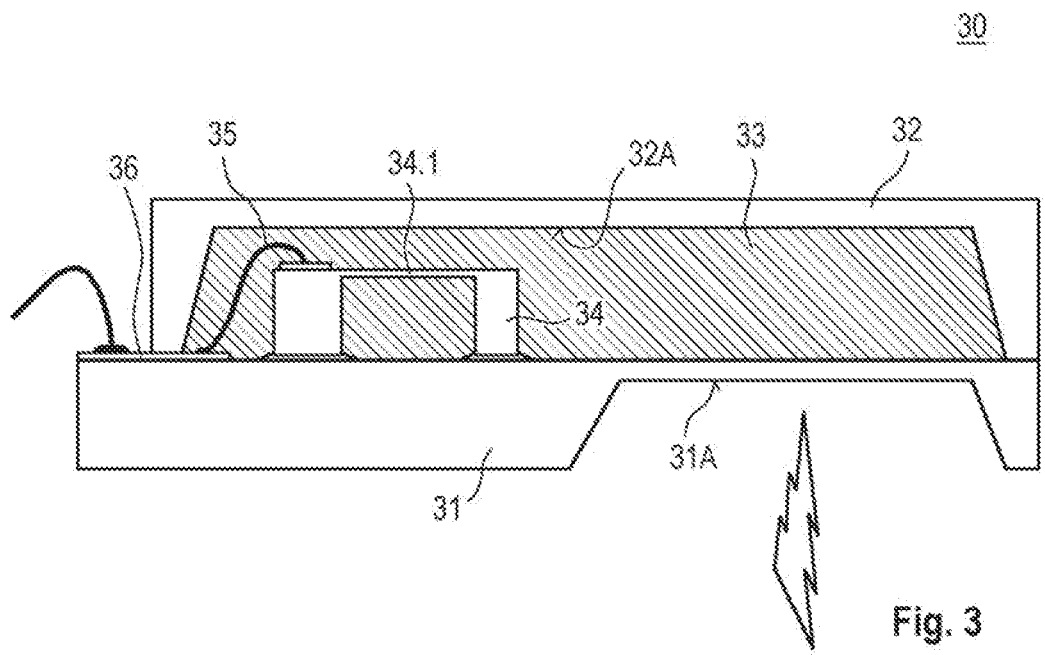
FIG. 3 shows an example of a detector module according to the first aspect in a cross-sectional view, wherein in this example a recess formed in the first substrate serves as a light inlet opening, and the membrane is disposed within the reference cell and is part of a semiconductor MEMS pressure sensitive element chip.

FIG. 3 shows another example of a detector module according to the first aspect. The detector module 30 of FIG. 3 comprises a first substrate 31 and a second substrate 32. The first substrate 31 comprises a recess 31A and the second substrate 32 comprises a recess 32A. When connecting the second substrate 32 with the first substrate 31, the recess 32A transforms into an air-tight cell 33 which is filled with a reference gas. The detector module 30 further comprises a pressure sensitive element 34 which is comprised of a semiconductor MEMS chip 34. The semiconductor MEMS chip 34 is disposed within the cell 33 and comprises an membrane 34.1 which is connected via a bond wire 35 with an electrical trace 36 extending through an intermediate space between the substrates 31 and 32 to the outside of the cell 33. The semiconductor MEMS chip 34 may be disposed within the cell 33 in such a way that it rests on and is connected to the first upper surface of the first substrate 31.

Figure 4:
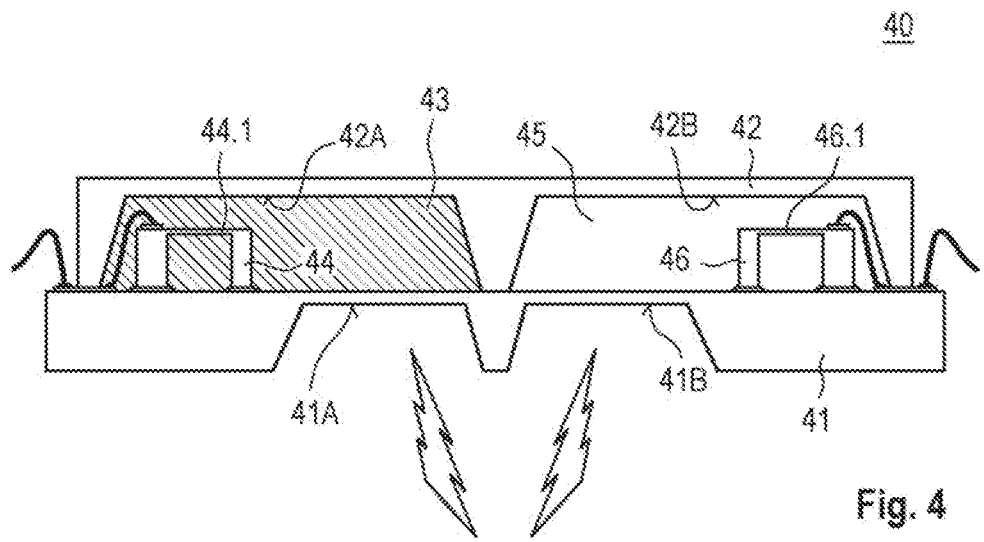
FIG. 4 shows an example of a detector module according to the first aspect in a cross-sectional view, wherein the first substrate comprises two recesses, wherein both recesses serve as light inlet openings, and the second substrate comprises as well two forming a first cell filled with a reference gas and a second cell not filled with a reference gas, the detector module thus allowing differential measurements.

FIG. 4 shows another example of a detector module according to the first aspect. The detector module 40 of FIG. 4 comprises a first substrate 41 and a second substrate 42, wherein the first substrate 41 comprises a first recess 41A and a second recess 41B, and the second substrate 42 comprises as well a first recess 42A and a second recess 42B. The first and second recesses 42A and 42B of the second substrate 42 transform into a first cell 43 and a second cell 45 when connecting the second substrate 42 to the first substrate 41. The first cell 43 is filled with a reference gas, wherein the second cell 45 is not filled with a reference gas wherein it can be either virtually empty or filled with another neutral gas like air which does not generate any signal. The detector module 40 further comprises a first semiconductor pressure sensitive element MEMS chip 44, wherein the first semiconductor MEMS pressure sensitive element chip 44 comprises an membrane 44.1. The semiconductor MEMS chip 44 is disposed within the first cell 43. The detector module 40 further comprises a second semiconductor MEMS pressure sensitive element chip 46. The semiconductor MEMS chip 46 is disposed within the second cell 45 and comprises an membrane 46.1. The detector module 40 of FIG. 4 allows to perform a differential measurement, wherein a measurement signal is generated by the first pressure sensitive element chip 44 and a background signal is generated by the second pressure sensitive element chip 46, and afterwards the background signal is subtracted from the measurement signal by an electronic circuit connected with the first and second pressure sensitive element chips 44 and 46. In this manner a background-free measurement signal can be generated.

Figure 5:
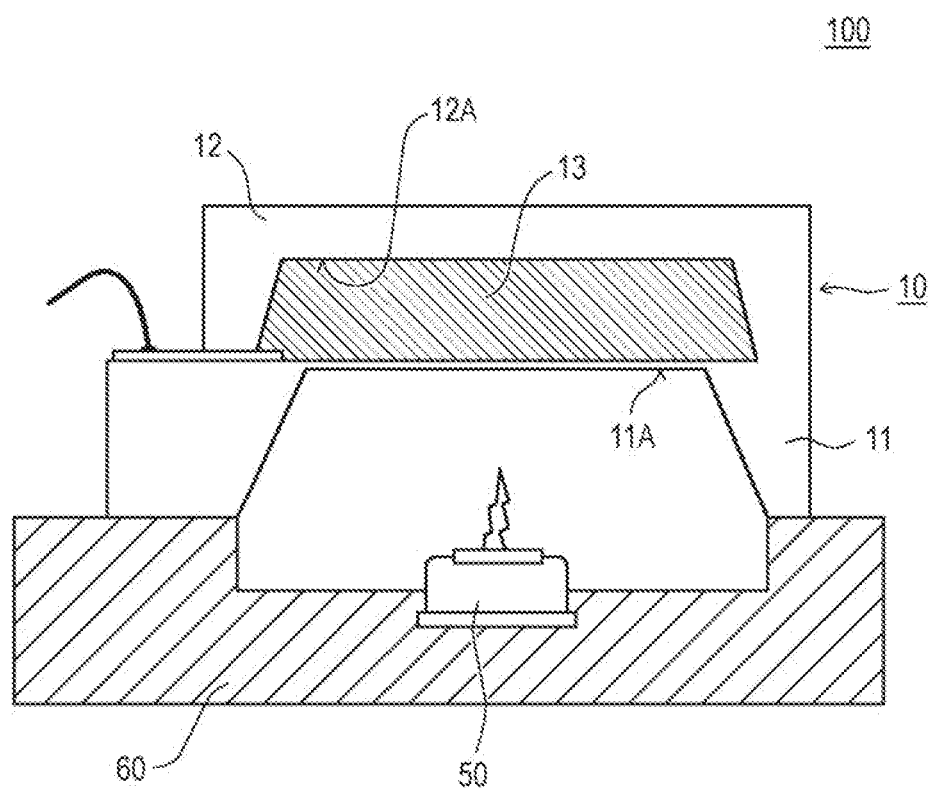
FIG. 5 shows an example of a photo-acoustic gas sensor according to the second aspect in a cross-sectional view, wherein the photo-acoustic gas sensor comprises a detector module according to the first aspect and an emitter module, both modules being fastened to a common platform.

FIG. 5 shows an example of a photo-acoustic gas sensor according to the second aspect. The photo-acoustic gas sensor 100 of FIG. 5 comprises a detector module 10 like the one shown and described in connection with FIG. 1, an emitter module 50, and a platform 60. Both the detector module 10 and the emitter module 50 are securely fastened to the platform 60 so that the detector module 10 and the emitter module 50 are in a fixed spatial relationship to each other. Instead of the detector module 10, which was described in connection with FIG. 1, also anyone of the other shown and described detector modules 20, 30 or 40 can be implemented in the photo-acoustic sensor 100. It should be noted that in case of a differential measurement and the corresponding implementation of a detector module 40 of FIG. 4, a second emitter module would have to be implemented and connected with the platform 60. It should further be noted that an intermediate space between the emitter module 50 and the detector module 10, in particular the bottom of the recess 11A, should be in fluid connection with the outside. More specifically, there may be at least two openings of the intermediate space to the outside, in particular on opposing sides so that the gas to be sensed can freely flow through the intermediate space.

Figure 6:
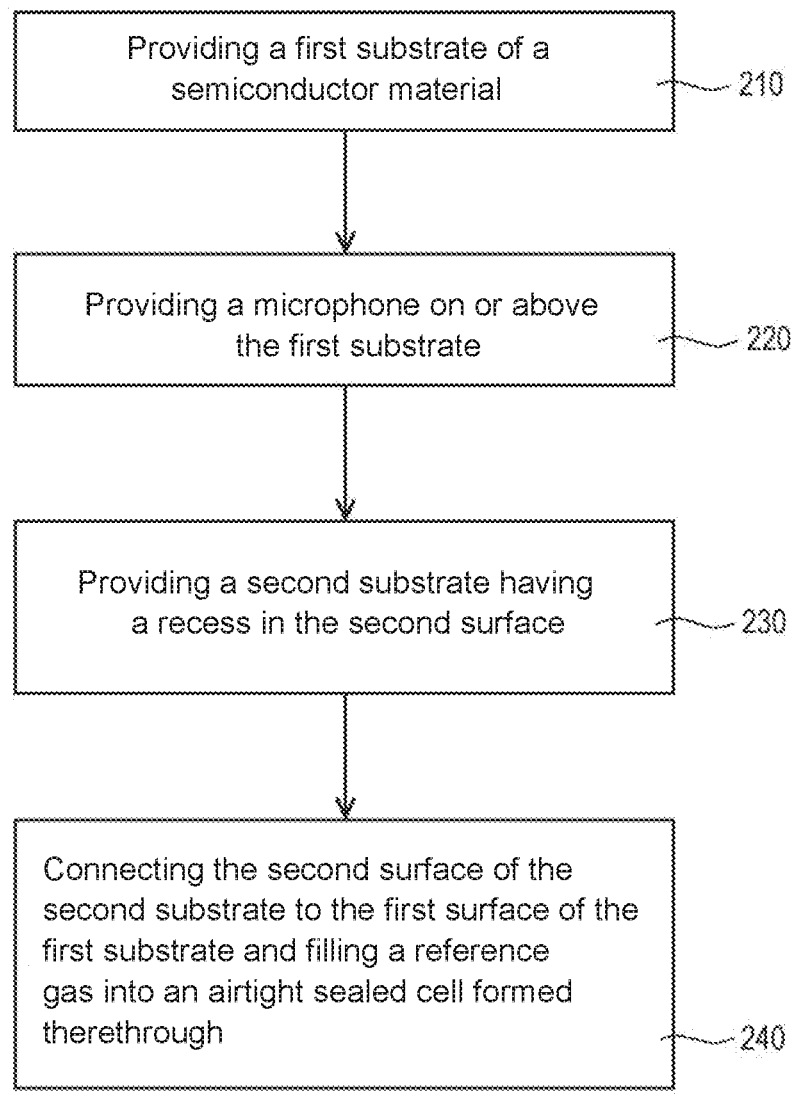
FIG. 6 shows a flow diagram of an example of a method for fabricating a detector module for a photo-acoustic gas sensor according to the third aspect.

FIG. 6 shows an example of a flow diagram for a method for fabricating a detector module for a photo-acoustic gas sensor according to a third aspect.

According to the method 200 of FIG. 6, a first substrate made of a semiconductor material, e.g. silicon, is provided, wherein the first substrate comprises a first upper surface and a second lower surface opposite to the first surface (210). In case of the method carried out on a wafer level basis, be formed in the second surface of the first substrate, the first substrate being, e.g. a semiconductor wafer, in particular a silicon wafer.

The method 200 of FIG. 6 further comprises providing a pressure sensitive element on or above the first substrate, the pressure sensitive element comprising a membrane (220). Depending on the type of pressure sensitive element, either a membrane has already been provided by forming a recess into the second surface of the first substrate and only a transducer like a piezoelectric layer has to be provided and connected with the membrane, or a pressure sensitive element MEMS chip has to be provided and disposed on the first surface of the first substrate. In the case of a wafer level process, a plurality of pressure sensitive elements will be provided and disposed by one of the two manners as described.

The method 200 of FIG. 6 further comprises providing a second substrate comprising a third upper surface and a fourth lower surface opposite to the third surface, wherein a recess is formed in the fourth surface (230). In the case of a wafer level process a plurality of recesses is formed in the fourth surface of a wafer, which can be a semiconductor wafer, in particular a silicon wafer, a (borosilicate-)glass wafer or a sapphire wafer, wherein the recesses are formed and distributed such that they are disposed opposite to possible recesses formed in the first substrate after connecting the first and second substrates with each other.

The method 200 of FIG. 6 further comprises connecting the second substrate with its fourth surface to the first surface of the first substrate and enclosing a reference gas in a thereby formed airtight-closed cell (240). Such connecting can, for example, be performed in a reference gas atmosphere. In case of a wafer level process, a plurality of airtight-closed cells will be produced in such a way.

FIG. 7 comprises FIG. 7A to 7D and illustrates a process for fabricating a plurality of detector modules by a wafer level process.

Figure 7A:
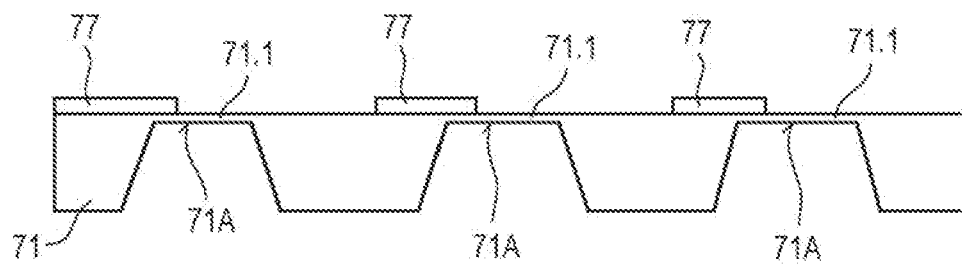
FIG. 7 comprises FIG. 7A to 7D and shows schematic cross-sectional representations of intermediate products and an end product for illustrating a method for fabricating a detector module for a photo-acoustic gas sensor according to the third aspect, wherein the method comprises a wafer level process for fabricating a plurality of detector modules.

FIG. 7A shows a cross-sectional representation of a first substrate 71 in the form of a semiconductor wafer comprising a first upper surface and a second lower surface and a plurality of recesses 71A formed by anisotropic etching into the second lower surface. The depth of the recesses 71A is such that the resulting layer between the bottom surface of the recess 71A and the upper surface of the semiconductor wafer 71 comprises a thickness so that it can act as a membrane of a pressure sensitive element. A plurality of transducer layers 77, in particular piezoelectric layers, is disposed on the first upper surface of the semiconductor wafer 71 so that the transducer layers 77 are each mechanically connected with one of the resulting membranes 71.1.

Figure 7B:
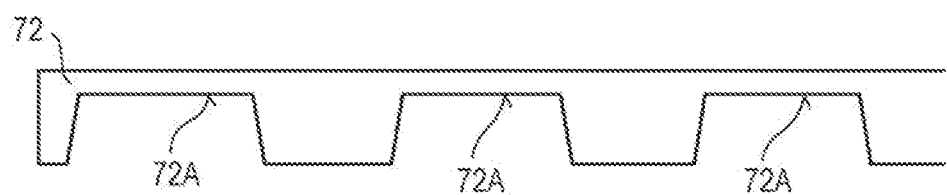

FIG. 7B shows a cross-section of a second substrate 72 which can have the same size and form as the first substrate 71 and which comprises a plurality of recesses 72A, which are disposed at the same lateral positions as the recesses 71A of the first substrate 71. The recesses can, e.g., also be formed by an etching process, in particular in case of a semiconductor material of the second substrate 72.

Figure 7C:
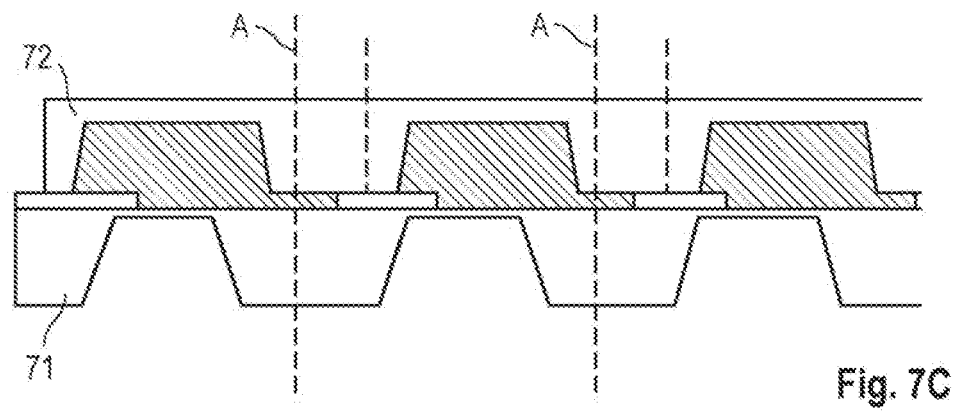

FIG. 7C shows a cross-section of a module panel obtained after connecting the first and second substrates 71 and 72 with each other by, for example, anodic bonding, soldering, or glass frit bonding. The process of connecting the substrates can be performed in a reference gas atmosphere, so that the resulting plurality of airtight-closed cells are all filled with the reference gas. Afterwards the module panel is singulated at the dashed lines A into a plurality of detector modules. It might become necessary to further remove parts of the second substrate 72 above the piezoelectric layers 77 along dashed lines B in order to allow electrically contacting the piezoelectric layers 77.

Figure 7D:
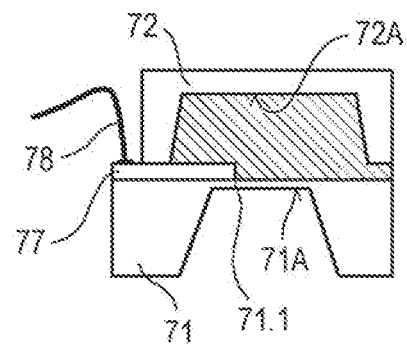

FIG. 7D shows a cross-section of a single detector module which is in principle the one as shown and described above in connection with FIG. 1. An electric wire 78 can then be connected to the exposed outside portion of the piezoelectric layer 77.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the concept of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The invention claimed is:

1. A detector module for a photo-acoustic gas sensor, comprising:
    a first substrate made of a semiconductor material and comprising a first surface and a second surface opposite to the first surface;
    second substrate comprising a third surface, a fourth surface opposite to the third surface, and a first recess formed in the fourth surface, wherein the second substrate is connected with its fourth surface to the first surface of the first substrate so that the first recess forms an airtight-closed first cell which is filled with a reference gas; and
    a pressure sensitive element comprising a membrane in contact with the reference gas;
    wherein the detector module is further configured such that a beam of light pulses passes through the first substrate and thereby enters the first cell, and wherein the first substrate comprises a second recess, wherein the second recess comprises a light inlet opening of the module.

2. The detector module according to claim 1, wherein the first substrate is made of silicon.

3. The detector module according to claim 1, wherein the second substrate is made by one or more of a semiconductor material, silicon, glass, or sapphire.

4. The detector module according to claim 1, wherein the second substrate is connected to the first substrate by one of anodic bonding, soldering or glass frit bonding.

5. The detector module according to claim 1, wherein the membrane is in part formed by the bottom of the second recess.

6. The detector module according to claim 1, wherein at least the bottom of the second recess of the first substrate is transparent at the wavelength of the light pulses.

7. The detector module according to claim 1, wherein at least the bottom of the first recess is transparent at the wavelength of the light pulses.

8. The detector module according to claim 1, further comprising:
    a transducer connected with the membrane and configured to convert oscillations of the membrane into an electrical signal, the transducer being disposed on the first surface of the first substrate.

9. The detector module according to claim 1, wherein the first substrate comprises a third recess formed in the second surface, wherein the oscillatory membrane is in part formed by the bottom of the third recess.

10. The detector module according to claim 1, wherein the membrane is part of a first semiconductor chip disposed in the first cell; and
    the second recess comprises a light inlet opening of the module.

11. The detector module according to claim 10, wherein the first substrate comprises a second recess formed in the second surface and a third recess formed in the second surface; and
    the second substrate comprises the first recess formed in the fourth surface and a fourth recess formed in the fourth surface, wherein the first recess forms a first closed cell which is filled with the reference gas, and the fourth recess forms a second closed cell which is not filled with the reference gas, and a first semiconductor chip comprising a first membrane is disposed in the first cell and a second semiconductor chip comprising a second membrane is disposed in the second cell.

12. A photo-acoustic gas sensor, comprising:
 at least one light emitter module; and
 a detector module according to claim 1.

13. A method for fabricating a detector module for a photo-acoustic gas sensor, the method comprising:
 providing a first substrate made of a semiconductor material and comprising a first surface and a second surface opposite to the first surface;
 providing a pressure sensitive element on or above the first substrate;
 providing a second substrate comprising a third surface and a fourth surface opposite to the third surface, and a first recess formed in the fourth surface; and
 connecting the second substrate with its fourth surface to the first surface of the first substrate and enclosing a reference gas in a thereby formed airtight-closed cell wherein the first substrate comprises a second recess, wherein the second recess comprises a light entry opening of the module.

14. The method according to claim 13, wherein
 enclosing the reference gas in the airtight-closed cell is performed by connecting the second substrate to the first substrate in a reference gas atmosphere.

15. The method according to claim 13, wherein
 enclosing the reference gas in the airtight-closed cell is performed by filling the reference gas into the airtight-closed cell via a through-opening formed in one of the first or second substrates.

16. The method according to claim 15, wherein
 the through-opening is sealed after filling the reference gas into the airtight-closed cell.

17. The method according to claim 13, wherein
 connecting the second substrate to the first substrate comprises one of anodic bonding, soldering, or glass frit bonding.

18. The method according to claim 13, further comprising fabricating a plurality of detector modules by performing a wafer level process.

19. The method according to claim 18, further comprising:
 providing a second substrate comprising a third surface and a fourth surface and a plurality of first recesses formed in the fourth surface;
 providing a plurality of microphones on or above the first substrate;
 fabricating a module panel by connecting the second substrate with its fourth surface to the first substrate and enclosing a reference gas in a thereby formed plurality of airtight-closed first cells; and
 singulating the module panel into a plurality of separate detector modules.

20. A detector module for a photo-acoustic gas sensor, comprising:
 a first substrate made of a semiconductor material and comprising a first surface and a second surface opposite to the first surface;
 second substrate comprising a third surface, a fourth surface opposite to the third surface, and a first recess formed in the fourth surface, wherein the second substrate is connected with its fourth surface to the first surface of the first substrate so that the first recess forms an airtight-closed first cell which is filled with a reference gas; and
 wherein the first substrate comprises a second recess formed in the second surface, the second recess forming a membrane of the first substrate in contact with the reference gas;
 wherein the detector module is further configured such that a beam of light pulses passes through the first substrate and thereby enters the first cell; and
 wherein the detector module further comprises a transducer connected with the membrane and configured to convert oscillations of the membrane into an electrical signal, the transducer being disposed on the first surface of the first substrate.

* * * * *